United States Patent [19]

Hoffmann

[11] Patent Number: 4,811,363
[45] Date of Patent: Mar. 7, 1989

[54] METHOD FOR RECOVERING A PHASE DIFFERENCE SIGNAL

[75] Inventor: Michael Hoffmann, Backnang, Fed. Rep. of Germany

[73] Assignee: Ant Nachrichtentechnik GmbH, Backnang, Fed. Rep. of Germany

[21] Appl. No.: 62,366

[22] Filed: Jun. 12, 1987

[30] Foreign Application Priority Data

Jun. 12, 1986 [DE] Fed. Rep. of Germany ....... 3619744

[51] Int. Cl.$^4$ .................................................. H03D 3/02
[52] U.S. Cl. ..................................... 375/83; 375/120; 375/97; 329/124
[58] Field of Search ................... 375/83, 120, 96, 102, 375/97; 329/112, 124, 122

[56] References Cited

U.S. PATENT DOCUMENTS

| | | | |
|---|---|---|---|
| 4,084,137 | 3/1978 | Welti | 375/38 |
| 4,404,532 | 9/1983 | Welti | 329/124 |
| 4,509,017 | 4/1985 | Andren et al. | 375/83 |
| 4,513,429 | 4/1985 | Roeder | 375/120 |
| 4,538,111 | 8/1985 | Guisto | 329/122 |
| 4,546,322 | 10/1985 | Crutcher | 375/83 |
| 4,687,999 | 8/1987 | Desperben et al. | 329/124 |

FOREIGN PATENT DOCUMENTS

| | | |
|---|---|---|
| 0079576 | 5/1983 | European Pat. Off. . |
| 0071514 | 7/1983 | European Pat. Off. . |
| 0154503 | 4/1985 | European Pat. Off. . |
| 61-24354 | 5/1986 | Japan . |

OTHER PUBLICATIONS

A. Leclert et al., "Universal Carrier Recovery Loop for QASK and PSK Signal Sets," IEEE Transactions on Communications, vol. Com-31, No. 1, Jan. 1983, pp. 130-136.

Tho Le-Ngoc et al., "A Digital Approach to Symbol Timing Recovery Systems," IEEE Transactions on Communications, vol. Com-28, No. 12, Dec. 1980, pp. 1993-1999.

Analog Devices Corporation data sheet and application notes, "Universal Trigonometric Function Generator AD639," pp. 1-12.

Analog Devices Corporation data sheet and application notes, "High Precision Wide-Band RMS-DC Converter AD637," pp. 1-8.

Analog Devices Corporation data sheet and application notes, "Balanced Modulator/Demodulator AD630," pp. 1-8.

Primary Examiner—Robert L. Griffin
Assistant Examiner—Marianne Huseman
Attorney, Agent, or Firm—Spencer & Frank

[57] ABSTRACT

A method of recovering a signal representing the phase difference between a local carrier signal and the carrier of an amplitude and/or phase shift keyed received signal involves dividing the received signal into two cartesian oriented signal components which are a function of the phase difference and have a quadrature relationship to one another. Each pair of cartesian oriented signal components, representing one of a plurality of possible signal states, is converted into two polar oriented signal components. A decision is made as to which ones of the permitted, unfalsified polar signal components come closest to the polar signal components of the received signals. The phase difference is derived from a comparison between the result of the decision and the received polar signal components.

25 Claims, 9 Drawing Sheets

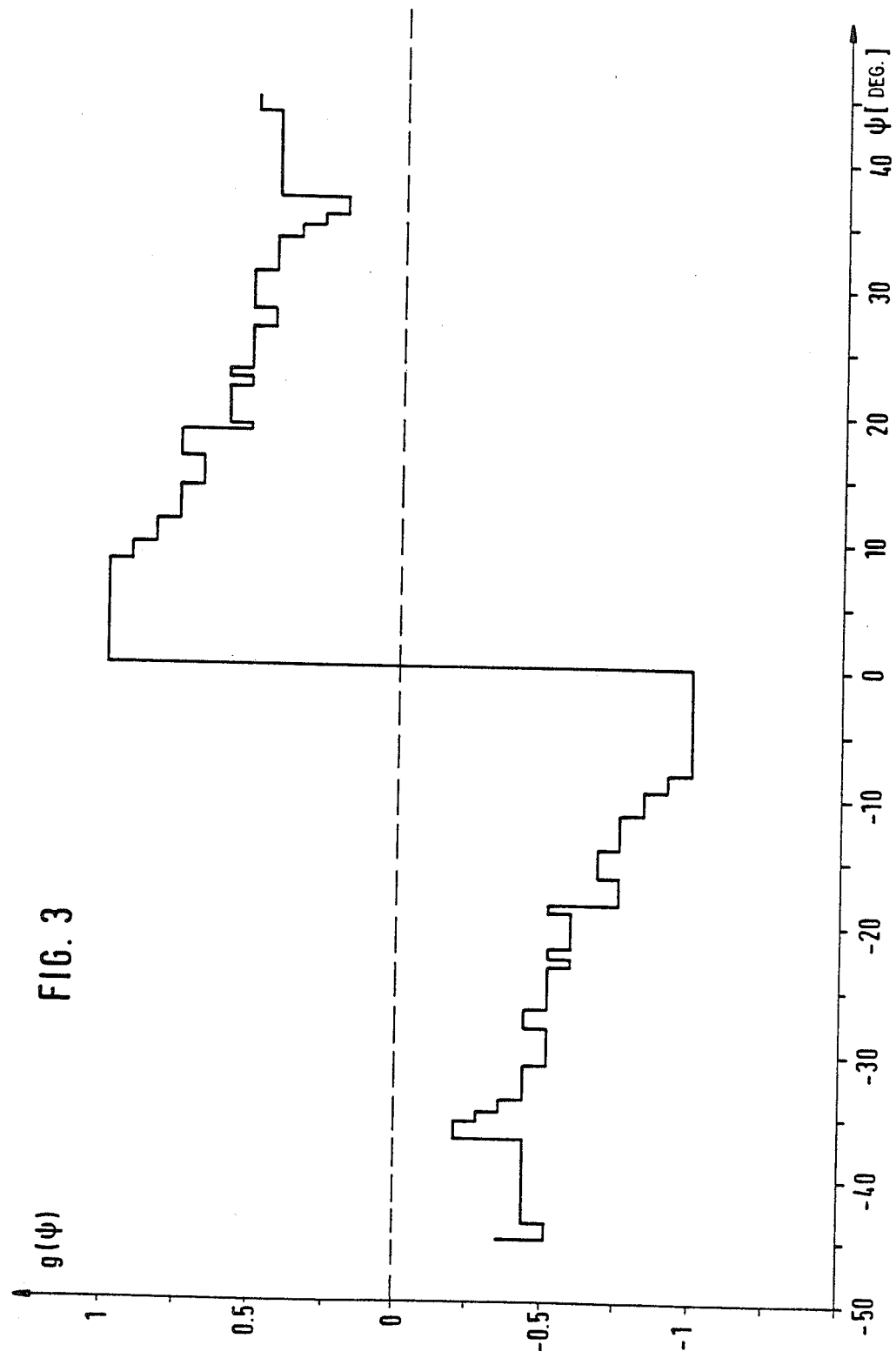

METHOD FOR RECOVERING A PHASE DIFFERENCE SIGNAL

BACKGROUND OF THE INVENTION

The present invention relates to a method for recovering a signal representing the phase difference between a local carrier signal and the carrier of an amplitude and/or phase shift keyed received signal, with the received signal being divided into two cartesian oriented signal components which are a function of the phase difference and which are in a quadrature relationship to one another, and with these two signal components together representing one of the possible signal states.

Such a method is described, for example, in the article by A. Leclert and P. Vandamme, "Universal Carrier Recovery Loop for QASK and PSK Signal Sets," in IEEE TRANSACTIONS ON COMMUNICATIONS, Vol. COM-31, No. 1, January 1983, pages 130-136, for the recovery of a control signal for a voltage controlled oscillator which is used to recover the carrier in a demodulator circuit for amplitude and/or phase shift keyed (QASK) signals. A control signal generated according to this prior art method, which represents the phase difference between two carrier signals, falsely indicates some phase differences as 0° when they do in fact differ substantially from 0°.

SUMMARY OF THE INVENTION

It is an object of the present invention to provide a method of the above-mentioned type with which a signal can be recovered that gives unequivocal information about when the phase difference between a local carrier signal and a QASK carrier is precisely 0° or a phase equivalent thereto (e.g. for 64-QAM, 0°+n90°, n being a integer number).

This is accomplished, according to one embodiment of the present invention, by converting each pair of cartesian oriented signal components into a corresponding pair of polar oriented signal components, a first one of which represents the amplitude of a signal state vector formed by the pair of cartesian oriented signal components and a second one of which represents the phase angle for this signal state vector; using a first (multilevel) decision circuit or quantizer to determine which predetermined value, from a set of predetermined amplitude values derived from all true signal states, comes the closest to the amplitude represented by the first polar oriented signal component; using a second quantizer to determine which predetermined value, from a set of predetermined phase angle values derived from all true signal states, belongs to a subset of phase angle values corresponding to the previously determined amplitude value and comes closest to the phase angle represented by the second polar oriented signal component; and determining the difference between the phase angle derived from the input signal and the phase angle determined by the second quantizer. This difference is proportional to the phase difference between the local carrier signal and the carrier of the received signal.

The present invention has the advantage that it can be implemented with inexpensive circuitry even if the invention is used for multi-level amplitude and/or phase shift keyed signals.

BRIEF DESCRIPTION OF THE DRAWINGS

FIG. 3 is a phase detector characteristic for a 64-QAM system.

DESCRIPTION OF THE PREFERRED EMBODIMENTS

Communications processes for the transmission of information by means of amplitude and/or phase shift keyed signals have gained significance continuously in recent years. Such signals include those generated by quadrature amplitude shift keying (abbreviated QASK), wherein a carrier is divided into two components at the same frequency but having a phase quadrature relationship to one another (that is, the 90° phase relationship between the sine and cosine functions), with the amplitude of each component being modulated in discrete steps. As a result each possible combination of phase and amplitude can be assigned a unique, multi-bit value for use in a multisymbol communication system as discussed, for example, in G. J. Foschini, R. D. Gitlin, and S. B. Weinstein, "On the Selection of a Two-Dimensional Signal Constellation in the Presence of Phase Jitter and Gaussian Noise," Bell System Technical Journal, Vol. 52, No. 6, July-August, 1973, pp. 927-965, or B. F. Logan, Jr., "Bandwidth-Error Exchange for a Simple Fading Channel Model," AT&T Technical Journal, vol. 64, No. 7, September 1985, pp. 1687-1704.

QASK signals are known to be describable as follows:

$$u_1(t) = \hat{u}_1 \Sigma_k f(t-kT) \cdot \{a_K \cos(\omega t + \phi) + b_K \sin(\omega t + \phi)\} \quad (1)$$

where $\cos(\omega t + \phi)$ is the normal or inphase component of the received signal carrier $u_1$, $\sin(\omega t + \phi)$ is the quadrature component of the signal carrier $u_1$, and $f(t)$ is a function which results from signal shaping and sampling and which meets the following condition for particular values of t to avoid intersymbol interference:

$$f(t) = \begin{cases} 1 \text{ for } t = 0 \\ 0 \text{ for } t = nT, \text{ an integer number, } n \neq 0 \end{cases} \quad (2)$$

The value pairs ($a_K$, $b_K$) contain the time-and-value-discrete information to be transmitted at times t=kT (where T is the symbol rate). In a given M-level communication scheme, the value pairs ($a_K$, $b_K$) must take on only M different value combinations. The M-symbol quadrature amplitude modulation methods (QAM methods) are of particular significance.

The literature also describes other QASK modulation methods, for example combinations of n-PSK/k-ASK (n+k=M) or combinations of n-PSK/k-ASK (n+k>M). The discussion below applies for all QASK methods but will be described primarily with reference to QAM methods.

Figure 1:
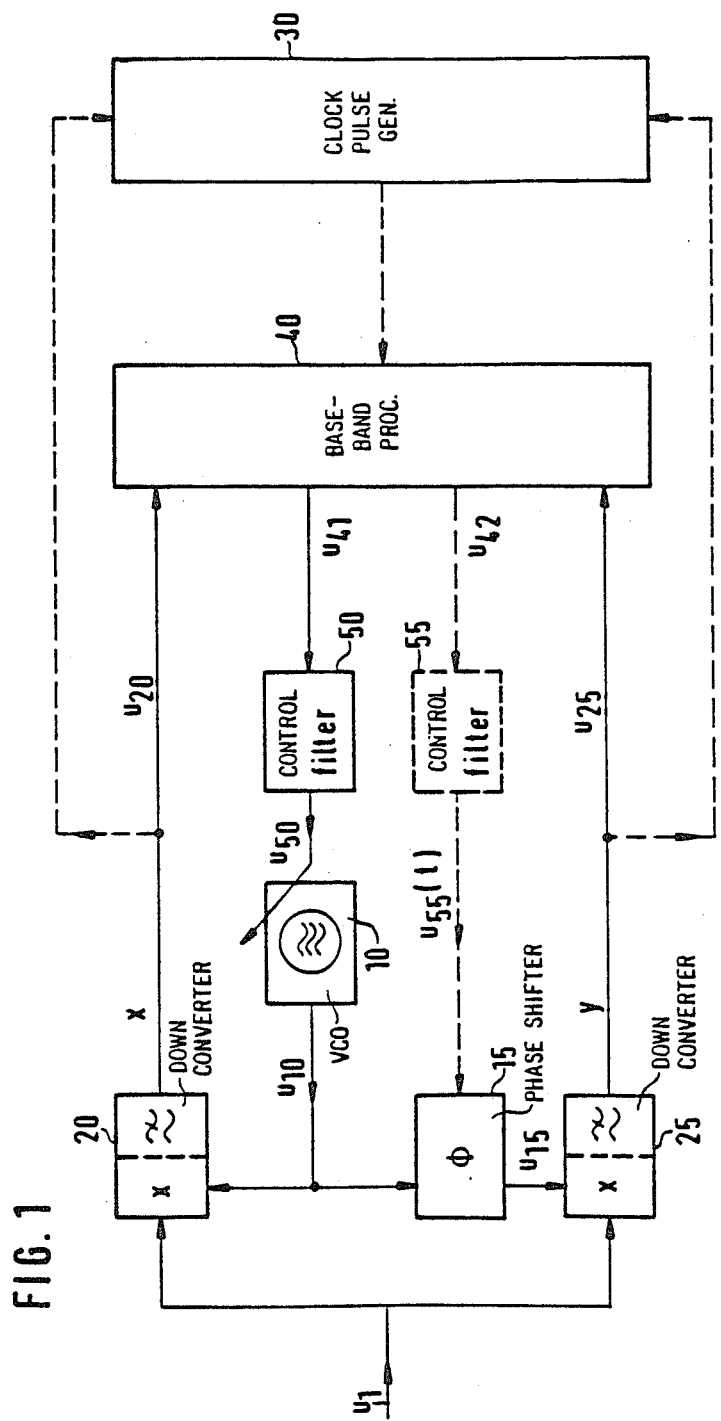
FIG. 1 is a circuit block diagram for a QASK receiver.

The prior art circuit block diagram shown in FIG. 1 illustrates the known circuit principle of a quadrature receiver suitable for the demodulation of QASK signals. In FIG. 1 solid lines are used to illustrate essential circuitry for regenerating the carrier of the received input signal $u_1$; the dotted-line connections, however, are also preferably present in the circuit.

In FIG. 1 a voltage controlled oscillator (VCO) 10 generates a signal $u_{10}$ which has a fixed phase relationship to the carrier of the input signal $u_1(t)$:

$$u_{10}(t) = \hat{u}_{10} \cdot \cos(\omega t + \phi + \psi) \quad (3)$$

The phase $\psi$ is a function of the VCO control signal $u_{50}$ coming from a control filter 50. A phase shifter 15 forms from signal $u_{10}(t)$ a signal $u_{15}$ shifted in phase by 90° thereto:

$$u_{15}(t) = \hat{u}_{10} \cdot \sin(\omega t + \phi + \psi) \quad (4)$$

Down converters 20 and 25 generate from input signal $u_1(t)$ and from signals $u_{10}(t)$ and $u_{15}(t)$, respectively, the signals $$u_{20}(t) = A \cdot \Sigma_K f(t - kT) \cdot \{a_K \cos \psi - b_K \sin \psi\} \quad (5)$$

and $$u_{25}(t) = A \cdot \Sigma_k f(t - kT) \cdot \{a_K \sin \psi - b_K \cos \psi\} \quad (6)$$

The information contained in $u_{20}(t)$ and $u_{25}(t)$ regarding the clock pulse frequency 1/T and its phase position can be utilized in a clock pulse regenerator 30 to regenerate a clock pulse signal in the correct phase position. One embodiment of a clock pulse regenerator is disclosed, for example, in an article by Tho Le-Ngoc and Kamilo Feher, entitled "A Digital Approach to Symbol Timing Recovery Systems," IEEE Trans. Com., Vol. COM-28, No. 12, December, 1980, pages 1993–1999.

The regenerated clock pulse signal is used to sample the signals $u_{20}(t)$ and $u_{25}(t)$ at times t=kT. This task is performed, in addition to others, in a baseband processor 40. The following applies for the two baseband signal components in quadrature relationship:

$$x = u_{20}(kT) = A \cdot (a_K \cos \psi - b_K \sin \psi) \quad (7)$$

$$y = u_{25}(kT) = A \cdot (a_K \sin \psi + b_K \cos \psi) \quad (8)$$

For $\psi = 0$, the two signal components x and y represent the demodulated information $a_K$, $b_K$. A significant task of the demodulator circuit is thus to change the phase $\psi$ to 0. Since at $\psi = 0$ the locally generated signal $u_{10}(t)$ is identical with one carrier component of the input signal $u_1(t)$, except for an amplitude factor, $u_{10}(t)$ is the locally regenerated carrier signal.

The output signal $u_{41}(t)$ of the baseband processor 40, to be described below, is a function of the phase difference between the carrier of the received input signal $u_1(t)$ and the local carrier signal $u_{10}(t)$ generated by voltage controlled oscillator 10. The signal $u_{41}(t)$ is filtered in the circuit of FIG. 1 by a control filter 50, which provides an output signal $u_{50}(t)$ that is applied as the control signal for voltage controlled oscillator (VCO) 10.

Down converters 20 and 25, baseband processor 40, control filter 50, VCO 10, and phase shifter 15 in the circuit of FIG. 1 form a control loop for the local regeneration of the carrier of input signal $u_1(t)$. At the same time, blocks 20, 25, 10 and 15 constitute the quadrature receiver.

It is significant for correct demodulation (the demodulated output is illustrated at 60 in FIG. 1) that the locally regenerated carrier components $u_{10}(t)$ and $u_{15}(t)$ are shifted in phase with respect to one another by 90°. In practice, however, small deviations from the 90° phase difference may exist. Then, instead of Equations (3) and (4), the following applies:

$$u_{10}(t) = \hat{u}_{10} \cos(\omega t + \phi + \psi) \quad (9)$$

$$u_{15}(t) = \hat{u}_{10} \sin(\omega t + \phi + \psi + \delta) \quad (10)$$

This change Equations (7) and (8) to $$x = A \cdot \{a_K \cos \psi - b_K \sin \psi\} \quad (11)$$

$$y = A \cdot \{a_K \sin(\psi + \delta) + b_K \cos(\psi + \delta)\} \quad (12)$$

These equations indicate at once that for optimum demodulation it is desirable to obtain $\psi = \delta = 0°$. In addition to the carrier regeneration loop which minimizes the phase difference $\psi$, there is thus also available a second control loop to minimize $\delta$.

For this purpose, phase shifter 15 in the circuit of FIG. 1 may be constructed in such a manner that fine tuning of the phase shift 15 becomes possible by way of a control signal. The recovery of the additional control information $u_{42}(t)$, which then becomes necessary, can also be obtained in baseband processor 40.

In the block circuit diagram of FIG. 1, the regulating signal $u_{42}(t)$, which is a function of the phase difference $\delta$ between the carrier signal components $u_{10}(t)$ and $u_{15}(t)$ and which is determined in a manner similar to signal $u_{41}(t)$, is fed to a control filter 55 whose output signal $u_{55}(t)$ is fed to the control input of phase shifter 15.

Down converters 20 and 25, baseband processor 40, control filter 55, local oscillator 10, and phase shifter 15 form the control loop for bringing the phase difference $\delta$ to the value 0°.

With the foregoing by way of background, the new method of the present invention can now be described. The invention, which is preferably implemented within baseband processor 40, is directed to an improved method of generating the signal $u_{41}$ for controlling VCO 10. As will be discussed, the invention provides a method for forming a signal which is a function of the phase difference between the local carrier signal and the carrier of the received signal and which unequivocally becomes zero only if the phase difference is indeed 0° or a phase equivalent thereof.

The normal or inphase and quadrature components x and y of the waveform envelope of the received signal $u_1(t)$ are formed in the quadrature receiver of FIG. 1. The quadrature receiver thus generates two signal components x and y which are orthogonally oriented according to cartesian coordinates.

In a first method step according to the invention, the cartesian oriented signal components x and y are converted into two polar oriented signal components $$R = \sqrt{x^2 + y^2} \qquad (13)$$

$$\alpha = \begin{cases} \arctan(y/x) & \text{if } x \geq 0 \\ \arctan(y/x) + \pi, & \text{if } x < 0, \end{cases} \qquad (14)$$

with the polar signal component R representing the amplitude of a signal state vector formed by the two cartesian oriented signal components x and y and the other polar signal component $\alpha$ representing the phase angle for this signal state vector. Using Equations (7) and (8), with the term A in these equations being set to 1, the following applies for the polar signal components R and $\alpha$:

$$R = \sqrt{a_K^2 + b_K^2} \qquad (15)$$

$$\alpha = \begin{cases} \psi + \arctan(b_K/a_K), & \text{if } x \geq 0 \\ \psi + \arctan(b_K/a_K) + \pi, & \text{if } x < 0 \end{cases} \qquad (16)$$

With the aid of a quantizer, the correct amplitude of the transmitted signal state $(a_K, b_K)$ can be determined from R even if signal components x and y are slightly falsified by noise or by a shift in the sampling instant with respect to kT.

The procedure for determining the quantizer output signal values, which is of fundamental importance for rating the quantizer, is as follows. For all permitted transmitting signal states $(a_K, b_K)$ the amplitude values $R = \sqrt{a_K^2 + b_K^2}$ are determined and arranged according to magnitude. Thus, one obtains r different values $R_i$, the "nominal amplitudes", at $$0 \leq R_1 < \ldots < R_i < \ldots < R_r.$$

The quantizer for the amplitude must then be able to generate precisely these r output values. The decision thresholds $\widetilde{R}_i$ are determined as follows:

$$0 = \widetilde{R}_0 \leq R_1 < \widetilde{R}_1 < R_2 < \widetilde{R}_2 < \ldots < \widetilde{R}_{r-1} < R_r < \widetilde{R}_r.$$

Within this arrangement, the selection of the threshold values $\widetilde{R}_i$ is still substantially flexible. A value R to be quantized has the decided value $\hat{R} = R_i$ associated with it, if the following applies:

$$\widetilde{R}_{i-1} < R < \widetilde{R}_i.$$

A recommendable threshold position is determined in that the probabilities of finding R within the interval $(R_i, R_{i+1})$ if all possible signal states having the amplitude value $R_i$ have been transmitted, are set to be the same for all i. Another, simpler way to define the threshold is given, for example, by $$\widetilde{R}_i = (R_i + R_{i+1})/2 \text{ for } i = 1, \ldots, r-1.$$

Figure 2:
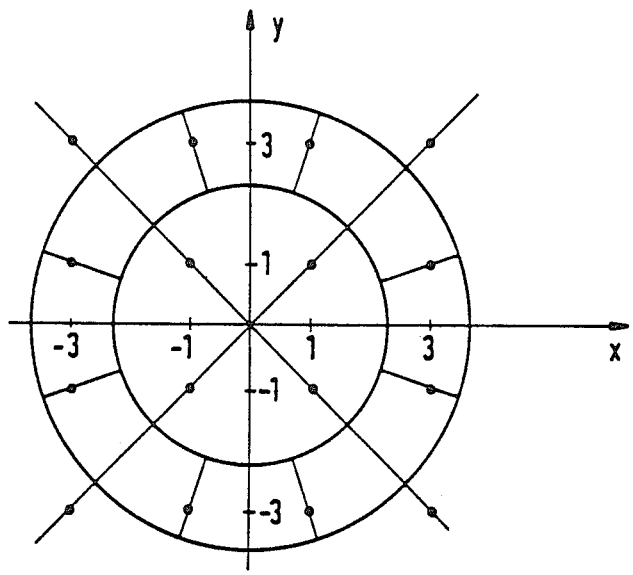
FIG. 2 is a decision diagram for a 16-QAM system.

Perhaps at this point a brief digression would be appropriate so that the nature of the nominal amplitudes $R_i$ and the decision thresholds $\widetilde{R}_i$ discussed above can be clarified with the aid of a simple example. In this example it will be assumed that k is limited to 4 for each of the orthogonal signal components, thereby providing a 16-QAM system as illustrated in FIG. 2, and that the permissible signal states are $a_1 = 1$, $a_2 = 3$, $a_3 = -1$, $a_4 = -3$, $b_1 = 1$, $b_2 = 3$, $b_3 = -1$, and $b_4 = -3$. Applying equation (15), it will be seen that there are three nominal amplitudes $R_i$. Considering $a_1$ and $b_1$, the nominal amplitude is $R_1 = \sqrt{2}$. The combinations $a_1$ and $b_2$ on the one hand, and $a_2$ and $b_1$ on the other hand, both lead to a nominal amplitude $R_2 = \sqrt{10}$. Finally, the combination of $a_2$ and $b_2$ provides a value $R_3 = \sqrt{18}$. The same amplitude values are found for all other permissible signal states. It will be apparent that these three values can be arranged by magnitude in a sequence, and that decision thresholds $\widetilde{R}_i$ can be selected between elements of this sequence so that the amplitude component R of a received signal can be compared with the decision thresholds $\widetilde{R}_i$ in order to ascertain which nominal value $R_i$ matches the received signal most closely. For example $(\sqrt{2} + \sqrt{10})/2$ might be selected as the decision threshold $\widetilde{R}_1$ and $(\sqrt{10} + \sqrt{18})/2$ might be selected as the decision threshold $\widetilde{R}_2$. In this way the magnitude of the amplitude component R of a received signal can be compared to $\widetilde{R}_1$ and $\widetilde{R}_2$ so that the received component R can be assigned the closest nominal amplitude $R_1$, $R_2$, or $R_3$.

Figure 9:
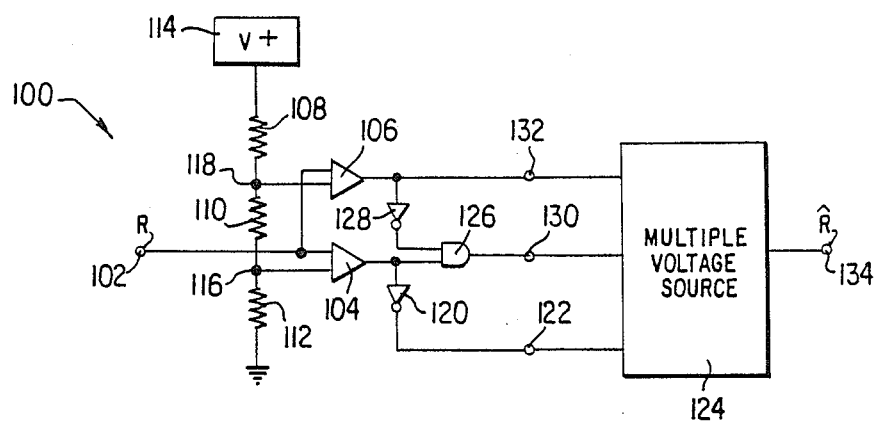
FIG. 9 is a circuit diagram illustrating an example of an analog implementation of a first quantizer, for determining the magnitude of the amplitude signal component in a 16-QAM system.

FIG. 9 illustrates an analog implementation of a first quantizer 100 for determining the best match between a received signal component R and the nominal amplitudes $R_1$, $R_2$, and $R_3$ in the above example. In FIG. 9, the amplitude signal component R is applied, via input terminal 102, to comparators 104 and 106. Resistors 108, 110, and 112 are series-connected between voltage source 114 and ground. The resistance values are selected so that the potential at intermediate connection point 116 is $\widetilde{R}_1$ and the potential at intermediate connection point 118 is $\widetilde{R}_2$. Accordingly, it will be apparent that comparator 104 turns ON if the amplitude component R of the received signal exceeds $\widetilde{R}_1$, and that comparator 106 also turns ON if it exceeds $\widetilde{R}_2$. On the other hand if the magnitude of the signal applied to terminal 102 does not exceed the lower decision threshold $\widetilde{R}_1$, comparator 104 remains OFF and consequently inverter 120 turns ON, thereby providing a signal via terminal 122 to multiple voltage source 124. Additionally, the output of comparator 104 is provided to one input of AND gate 126, the other input of which is connected by inverter 128 to the output of comparator 106. Gate 126 turns ON, and thus provides a signal via terminal 130 to multiple voltage source 124, when the magnitude of the signal applied to terminal 102 is greater than $\widetilde{R}_1$ but less than $\widetilde{R}_2$. Finally, when the magnitude of the input signal exceeds $\widetilde{R}_2$, comparator 106 turns ON to provide an input signal via terminal 132 to voltage source 124. Voltage source 124 generates an output signal, at terminal 134, whose value depends upon which of terminals 122, 130, and 132 is at a high level. When the potential at terminal 122 is logically high, thus indicating that the magnitude of the received signal component R is less than $R_1$, source 124 provides an output at the nominal amplitude $R_1$. Similarly, when the potential at terminal 130 is logically high the output at terminal 134 is the nominal amplitude $R_2$, and when the potential at terminal 132 is logically high the output voltage at terminal 134 is the nominal amplitude $R_3$. From the foregoing it will be seen that the output at terminal 134 provides the best match, from among the set of nominal amplitude values, to the input signal applied at terminal 102. This best match to the amplitude component R of the received signal will be deemed the decided value R.

Once the quantizer has decided that the amplitude value R of the received signal is R, there remains the problem of determining the most probably transmitted phase angle $\alpha$ from the phase angle $\alpha$ as determined by the cartesian coordinate signal components x and y.

The problems involved will be described in greater detail for the example of 16-QAM signals. Table 1 gives the relationships between the cartesian coordinates ($a_K$, $b_K$) and the polar coordinates (R, $\alpha$) of the permitted transmitted signal states.

In Table 1 the columns headed $a_k$ and $b_k$ indicate the permissible permutations and combinations for $a_1=1$, $a_2=3$, $a_3=-1$, $a_4=-3$, $b_1=1$, $b_2=3$, $b_3=-1$, and $b_4=-3$ to designate the permitted signal states illustrated in FIG. 2. The column headed "$\alpha$[rad]" represents phase angle, in radians, and the column headed "$\alpha$[deg.]" represents the phase angle, in degrees, calculated according to equation (16). The values in the final column are calculated in accordance with equation (15).

TABLE 1

| $a_K$ | $b_K$ | $\alpha$[rad] | $\alpha$[deg.] | $R^2$ |
|---|---|---|---|---|
| +1 | +1 |  arctan(1) | 45.0 | 2 |
| +1 | +3 |  arctan(3) | 71.6 | 10 |
| +3 | +1 |  arctan($\frac{1}{3}$) | 18.4 | 10 |
| +3 | +3 |  arctan(1) | 45.0 | 18 |
| −1 | +1 | $\pi$ + arctan(−1) | 135.0 | 2 |
| −1 | +3 | $\pi$ + arctan(−3) | 108.4 | 10 |
| −3 | +1 | $\pi$ + arctan(−$\frac{1}{3}$) | 161.6 | 10 |
| −3 | +3 | $\pi$ + arctan(−1) | 135.0 | 18 |
| −1 | −1 | $\pi$ + arctan(1) | 225.0 | 2 |
| −1 | −3 | $\pi$ + arctan(3) | 251.6 | 10 |
| −3 | −1 | $\pi$ + arctan($\frac{1}{3}$) | 189.4 | 10 |
| −3 | −3 | $\pi$ + arctan(1) | 225.0 | 18 |
| +1 | −1 |  arctan(−1) | −45.0 | 2 |
| +1 | −3 |  arctan(−3) | −71.6 | 10 |
| +3 | −1 |  arctan(−$\frac{1}{3}$) | −18.4 | 10 |
| +3 | −3 |  arctan(−1) | −45.0 | 18 |

Assume that signal state ($a_K$, $b_K$)=(3, 3) is being transmitted and that the carrier of the local oscillator 10 is shifted in phase by $\psi=25°$ with respect to the received signal carrier. Consequently, according to Equations (7) and (8) and with A=1, the following signals are generated:

$$x = 3(\cos 25° - \sin 25°) = 1.45$$

$$y = 3(\sin 25° + \cos 25°) = 3.99$$

and therefore, according to Equations (13) and (14):
$R = \sqrt{18}$ and $\alpha = 70°$.

The quantizer for amplitude value R will then correctly furnish the decided value $\hat{R} = \sqrt{18}$. Table 1 indicates that the angle closest to $\alpha=70°$ that can be taken up by one of the signal states is 71.6°. A decision for $\alpha$ indpendent of R would thus result in $\alpha=71.6°$. In fact, however, no signal state exists at (R, $\alpha$)=($\sqrt{18}$, 71.6°).

Thus, the decision for the phase angle must not be made independently of R.

According to Table 1, signal states having the angles −45°, 45°, 135° and 225° exist at $R=\sqrt{18}$. With the assumption that R is the correct amplitude value, a quantizer for the phase angle $\alpha$ should therefore decide on the value $\alpha=45°$ because this value is the closest value to $\alpha$ of the four values possible at $\hat{R}=\sqrt{18}$.

The decision for the polar signal components ($\hat{R}$, $\alpha$)=($\sqrt{18}$, 45°), which corresponds to the cartesian signal components (x, y)=(3, 3), is proven to be correct under the stated marginal conditions.

For a determination of the signal output values of the phase angle quantizer, the procedure must therefore be as follows:

The phase angles are determined for all permissible transmitted signal states ($a_k$, $b_k$) having the amplitude value $R_i$ and these are arranged according to magnitude. Thus, one obtains $q_i$ different phase angle values as follows:

$$-\pi/2 \leq \alpha_{i,1} < \ldots < \alpha_{i,j} < \ldots < \alpha_{i,q_i}.$$

At $\hat{R}=R_i$, the phase angle quantizer must then be able to generate precisely these $q_i$ output values. The decision thresholds $\tilde{\alpha}_{i,j}$ are then determined as follows:

$$\tilde{\alpha}_{i,0} < \alpha_{i,1} < \tilde{\alpha}_{i,1} < \alpha_{i,2} < \ldots$$
$$< \tilde{\alpha}_{i,q_i-1} < \alpha_{i,q_i} < \tilde{\alpha}_{i,0}+2\pi = \tilde{\alpha}_{i,q_i}.$$

Within this arrangement, the selection of threshold values $\tilde{\alpha}_{i,j}$ is still substantially flexible. A value $\alpha$ to be decided is then associated with the decided value $\tilde{\alpha}=\alpha_{i,j}$ if the following applies:

$$\tilde{R}_{i-1} < R < \tilde{R}_i \text{ and } \tilde{\alpha}_{i,j-1} < \alpha < \tilde{\alpha}_{i,j}.$$

A recommendable position for thresholds $\tilde{\alpha}_{i,j}$ is calculated in that the probabilities of finding $\alpha$ in the interval ($\tilde{\alpha}_{i,j-1}, \tilde{\alpha}_{i,j}$), if the signal state was transmitted with $R=R_i$ and $\alpha=\alpha_{i,j}$ and with a fixed i, are set to the same value for all values of j. Another possibility for defining the threshold is given, for example, by $$\tilde{\alpha}_{i,j} = (\alpha_{i,j}+\alpha_{i,j+1})/2 \text{ for } j=1, \ldots, q_{i-1};$$
$$\tilde{\alpha}_{i,q_i} = (\alpha_{i,q_i}+\alpha_{i,1}+2\pi)/2.$$

To clarify these points concerning the phase angle determination, consider again the previous example of a 16-QAM signalling system with $a_1=1$, $a_2=3$, $a_3=-1$, $a_4=-3$, $b_1=1$, $b_2=3$, $b_3=-1$, and $b_4=-3$. From Table 1 it will be seen that, when i=1, the four possible phase angles corresponding to the nominal amplitude $R_1(=\sqrt{2})$ are −45°, 45°, 135°, and 225°. When i=2, the eight possible phase angles corresponding to $R_2(=\sqrt{10})$ are −71.6°, −18.4°, 18.4°, 71.6°, 108.4°, 161.6°, 189.4°, and 251.6°. Similarly, when i=3 the four possible phase angles corresponding to $R_3(=\sqrt{18})$ form a set of discrete values which can be arranged in order of increasing magnitude. Accordingly, it will be apparent that for each of the three values of i in this example, a plurality j of threshold values $\tilde{\alpha}_{i,j}$ are needed so that the phase angle component $\alpha$ of a received signal can be matched with the closest appropriate phase angle for a true signal.

Figure 10:
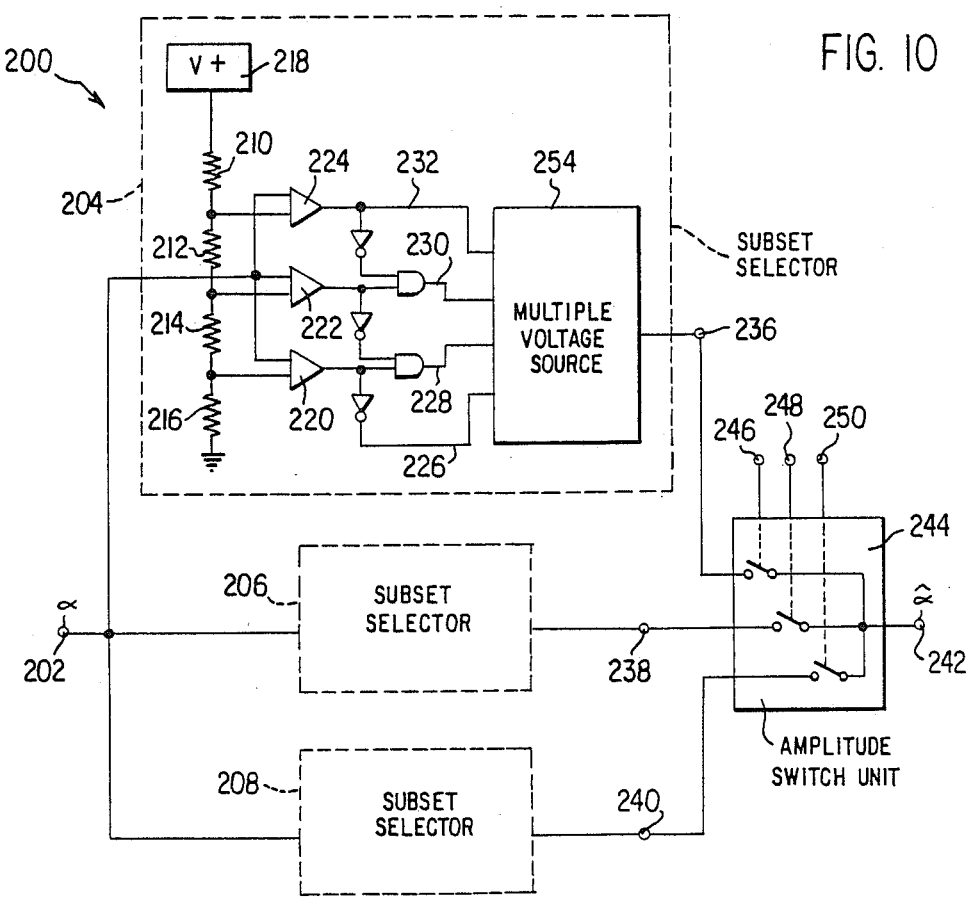
FIG. 10 is a circuit diagram illustrating an example of an analog implementation of a second quantizer, for determining a phase angle signal component which is consistent with the amplitude value determined by the first quantizer.

FIG. 10 illustrates an analog implementation of a second quantizer 200 for matching a received phase angle component α with an appropriate phase angle selected from the set of all phase angles for true signals in the 16-QAM signalling system of the example. As will be seen, the selection is made from among a subset which includes only the phase angles appropriate for the already-determined nominal amplitude $R_i$, so that the phase angle that is selected depends both upon $R_i$ and the decision thresholds $\bar{\alpha}_{i,j}$. The second quantizer 200 includes a terminal 202 for receiving an input signal corresponding to the phase angle component α of a received signal, the input signal being distributed to a subset selector 204 for use when the nominal amplitude of the received signal has been determined to be $R_1$, to another subset selector 206 for use when the nominal amplitude of the received signal has been determined to be $R_2$, and to a further subset selector 208 for use when the nominal amplitude of the received signal has been determined to be $R_3$. In selector 204, resistors 210, 212, 214, and 216 are connected between a voltage source 218 and ground to provide intermediate connection points which in turn provide threshold values $\bar{\alpha}_{1,1}$, $\bar{\alpha}_{1,2}$, and $\bar{\alpha}_{1,3}$ respectfully to comparators 220, 222, and 224. Each of these comparators also receives the input signal applied to terminal 202, and compares the magnitude of this input signal to the threshold voltage at the respective intermediate connection point. These threshold voltages are selected so that each corresponds to an appropriate decision threshold between a pair of adjacent phase angle values for a signal having the nominal amplitude $R_1$. From Table 1 it will be seen that a signal with this nominal amplitude may have a phase angle of −45°, 45°, 135°, or 225°. To distinguish between a −45° phase angle and a +45° phase angle, the voltage at the intermediate connection point sensed by comparator 220 corresponds to a decision threshold $\bar{\alpha}$ at 0°. Similarly, comparator 222 receives a voltage corresponding to a decision threshold $\bar{\alpha}$ at 90°, and comparator 224 receives a voltage corresponding to a decision threshold $\bar{\alpha}$ at 180°. Accordingly, the signal on conductor 226 becomes logically high when the input voltage at terminal 202 corresponds to a received phase angle α of less than 0°; the signal on conductor 228 becomes logically high when the input signal at terminal 202 corresponds to a received phase angle α of between 0° and 90°; the signal on conductor 230 becomes logically high when the input signal at terminal 202 corresponds to a phase angle α of between 90° and 180°; and the signal on conductor 232 becomes logically high when the input signal at terminal 202 corresponds to a phase angle α greater than 180°. If it is conductor 226 that is logically high, multiple voltage source 234 generates a voltage corresponding to precisely −45° at output terminal 236. Similarly, if it is conductor 228 that is logically high, source 234 generates a voltage corresponding to 45°; if it is conductor 230 that is logically high, the voltage at terminal 236 corresponds to 135°; and when conductor 232 is logically high, source 234 generates an output voltage corresponding to 225°. It should be noted that the output signals available at terminal 236 correspond to the subset of true phase angle values when the nominal amplitude is $R_1$.

Although not illustrated in detail, subset selector 206 is similar to selector 204 in construction except that it is able to generate the voltages, at its output terminal 238, which correspond to the phase angles for true signals when the nominal amplitude is $R_2$, and selector 208 generates signals at its output terminal 240 which correspond to the phase angles for true signals when the nominal amplitude is $R_3$. Together, the terminals 236, 238, and 240 can provide voltages corresponding to phase angles for the entire set of true signals.

The output terminal 242 of second threshold value decider 200 is connected to one of the terminals 236, 238, or 240 by amplitude switch unit 244. Which of terminals 236, 238, and 240 is selected depends upon the already-decided nominal mangitude of the amplitude component R of the received signal. For this purpose terminal 246 is connected to terminal 122 in FIG. 9; terminal 248 is connected to terminal 130 in FIG. 9; and terminal 250 is connected to terminal 132 in FIG. 9. It will be recalled that terminal 122 in FIG. 9 is logically high when the amplitude component R of the input signal has been determined to be $R_1$, and in this situation terminal 236 is connected to output terminal 242 so that a signal corresponding to a phase angle appropriate for a signal having a nominal amplitude $R_1$ is supplied at terminal 242 as the output of second threshold value decider 200. Similarly, when terminal 130 in FIG. 9 is logically high the output at terminal 242 will correspond to a phase angle appropriate for the nominal amplitude $R_2$, and when terminal 132 in FIG. 9 is high the phase angle output signal at terminal 242 will be appropriate for the nominal amplitude $R_3$. The output at terminal 242 will be deemed the decided phase angle $\hat{\alpha}$.

As demonstrated by the above example for 16-QAM, such a phase angle quantizer makes the following decision—if the phase shift between the input signal carrier and the carrier signal of the local oscillator is sufficiently small:

$$\hat{\alpha} = \begin{cases} \arctan(b_K/a_K), & \text{if } x \geq 0 \\ \arctan(b_K/a_K) + \pi, & \text{if } x < 0 \end{cases} \quad (17)$$

Using Equation (16) with Equation (17), one then obtains:

$$\hat{\alpha} - \alpha = \psi. \quad (18)$$

The difference according to Equation (18) between the angle α of a received signal state and the quantized angle α as a result of the quantization, which is a threshold value decision for the most likely the quantization which is a transmitted signal state, provides information about the phase difference ψ between the carrier of the received signal and the carrier of the local oscillator 10. This difference signal, which represents the phase difference and is hereinafter called the phase detector function $$\epsilon_1(\psi, \hat{R}) = \alpha - \hat{\alpha}, \quad (19)$$

can be used directly as the signal $u_{41}$ in FIG. 1 for adjustment of the phase of local oscillator 10 in accordance with the present invention. The function $\epsilon_1$ is dependent, in addition to ψ, also on the decided amplitude value $\hat{R}$, since the decided angle $\hat{\alpha}$ depends on R.

To recapitulate, FIG. 2 is a decision diagram for a 16-QAM modulated signal, with the dots representing the possible signal states for an ideally regenerated carrier, the concentric circles representing the thresholds for the amplitude value decision, and the lines passing through the zero point of the coordinate system representing the thresholds for the angle decision. The decision thresholds were formed by calculating the arithmetic mean of adjacent decided values $\hat{R}$ and $\hat{\alpha}$.

For each decision region defined by the circles, an individual phase detector function $$\epsilon_1(\psi, R_i) = \epsilon_1(\psi, \hat{R})_{\hat{R}=R_i}$$

can be calculated, which, within the region, no longer depends on the amplitude R of the received signal.

The same decision regions as for the phase detector function $\epsilon_1(\psi,\hat{R}) = \alpha - \hat{\alpha}$ will also be found for the following, modified individual phase detector functions which can be used, instead of the phase detector function in equation (19), to form the signal $u_{41}$:

$$\epsilon_2(\psi,\hat{R}) = \text{sgn}(\alpha - \hat{\alpha}) \quad (20)$$

$$\epsilon_3(\psi,\hat{R}) = w(\hat{R},\alpha)\cdot(\alpha - \hat{\alpha}) \quad (21)$$

$$\epsilon_4(\psi,\hat{R}) = w(\hat{R},\alpha)\cdot\text{sgn}(\alpha - \hat{\alpha}) \quad (22)$$

In these equations the function "sgn" means "sign of," such that sgn $(\alpha - \hat{\alpha}) = 1$ if $\alpha > \hat{\alpha}$, sgn $(\alpha - \hat{\alpha}) = 0$ if $\alpha = 2$ and sgn $(\alpha - \hat{\alpha}) = -1$ if $\hat{\alpha} > \alpha$.

In this case, $w(\hat{R},\alpha)$ is a non-negative function of the decided amplitude value $\hat{R}$ and of the phase angle $\alpha$. This term $w(\hat{R},\alpha)$ will hereinafter be called the weighting function. Using $w(\hat{R},\alpha)$, it is possible to emphasize several individual phase detector functions more than others. The state diagram in FIG. 2 shows that there are some amplitude regions in which an erroneous angle decision is less likely than in others. These are amplitude regions $R_i$ in which there are only a few signal states. If the function $w(R_i,\alpha)$ for these amplitude regions is greater, averaged over angles $\alpha_{i,j}$, than for the remaining amplitude regions, a phase detector characteristic $$g(\psi) = <\epsilon(\psi,\hat{R})>_{\hat{R}}$$

averaged with respect to R over all m individual phase detector functions (m = number of possible signal states) is influenced more by the individual phase detector function emphasized by $w(\hat{R},\alpha)$.

As an example, let us consider the use of Equation (22) $\epsilon_4(\psi,\hat{R})$ for 64-QAM signals. In this case, only four different angle values $\alpha_{i,qi}$ that can be decided exist at the amplitudes $R_1 = \sqrt{2}$, $R_3 = \sqrt{18}$ and $R_9 = \sqrt{98}$. If one selects, for example $w(R,\hat{\alpha}) = 4$ for $\hat{R} = R_1$, $R_3$ or $R_9$ and otherwise $w(R,\hat{\alpha}) = 1$, one obtains an average phase detector characteristic $g(\psi) = <\epsilon_4(\psi,\hat{R})>_{\hat{R}}$ as shown in FIG. 3. In this example, the arithmetic means of adjacent amplitude values $R_i$ and angle values $\alpha_{i,j}$ were selected as the quantizer thresholds. The phase detector characteristic has been normalized to a maximum amplitude of 1.

Synchronization of the voltage controlled oscillator VCO with the carrier of the received signal is effected for phase differences $\psi = \psi_s$, for which $g(\psi_s) = 0$ and $dg/d\psi > 0$ applies. As stated above, synchronization should be effected only for phase difference $\psi = \psi_s = 0°$. If $g(\psi_s) = 0$ within one interval $(-45°, +45°)$ even for $\psi = \psi_s \neq 0$, synchronization errors will occur. However, synchronization errors are caused by a control signal which is formed according to a method disclosed in the above-mentioned IEEE TRANSACTIONS ON COMMUNICATIONS, Vol. COM-31, No. 1, January, 1983, pages 130-136, since the phase detector characteristic includes a plurality of phase differences $\psi_s$ for which $g(\psi_s) = 0$. Such synchronization error points do not occur in the phase detector characteristic according to the present invention, as can be seen in FIG. 3. Here $g(\psi) = 0$ applies in the region of interest, $-45° < \psi < 45°$ exclusively for $\psi = 0°$.

Figure 4:
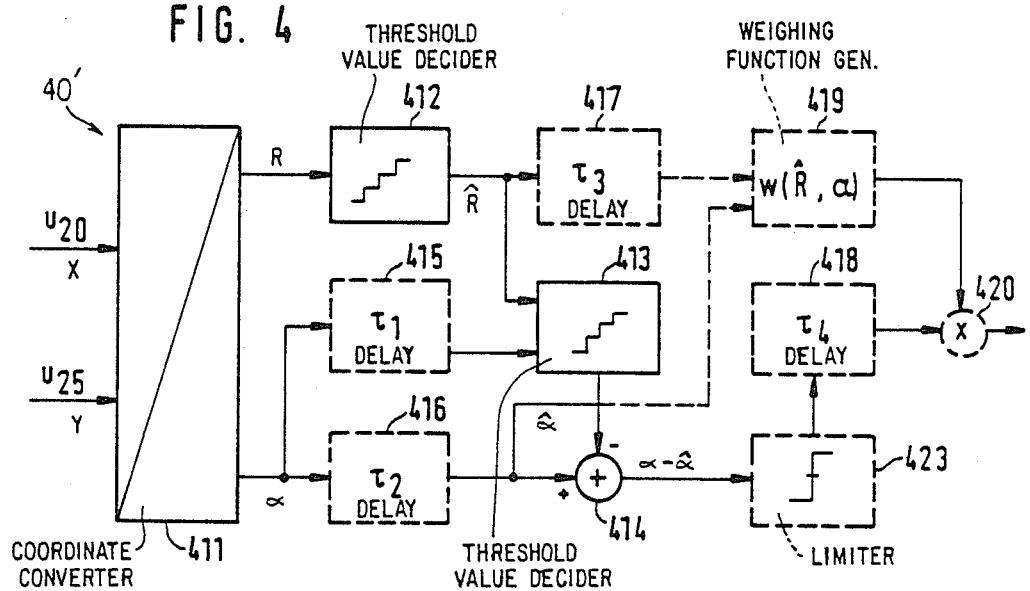
FIG. 4 is a block diagram of circuitry in a baseband processor for determining a phase difference signal in accordance with the present invention.

FIG. 4 is a circuit block diagram of a baseband processor portion 40' for implementing the above-described method. The basic implementation is shown in solid line, with dotted lines being used to illustrate alternatives.

From a coordinate converter 411, as it is known, for example, from Analog Devices, Data Sheet and Application Notes, AD639, AD637, AD630, Norwood, Mass. USA, June, 1985, the cartesian signal components x and y are transformed into polar signal components R and $\alpha$. The output signal of coordinate converter 411 which is proportional to the amplitude R is fed to a first threshold value decider 412 for the formation of a signal $\hat{R}$. The output signal of coordinate converter 411 proportional to the phase angle $\alpha$ is fed, via a delay block 415, to a second threshold value decider 413 which emits the signal $\hat{\alpha}$. The formation of the decided values $\hat{R}$ and $\hat{\alpha}$ has been described above. A second input of the second threshold value decider 413 is connected with the output of the first threshold value decider 412 to be able to make the decision process in block 413 dependent upon and already decided amplitude value $\hat{R}$. The output signal of coordinate converter 411 is additionally fed, via a delay block 416, to an adder 414. The second polarity inverting input of adder 414 is connected with the output of the second quantizer 413. A signal proportional to the phase angle difference $\alpha - \hat{\alpha}$ is then available at the output of adder 414. In one implementation of the invention, the output of adder 414 can be used to provide the signal $u_{41}$ for controlling VCO 10 in FIG. 1.

If one of the functions $\epsilon_2(\psi,\hat{R})$ according to Equation (20) or $\epsilon_4(\psi,\hat{R})$ according to Equation (22) is to be implemented, however, the output of adder 414 is connected to a hard limiter 423 such as a comparator to form the sign-of function sgn $(\alpha - \hat{\alpha})$. In those cases where the functions $\epsilon_3(\psi,\hat{R})$ according to Equation (21) or $\epsilon_1(\psi,\hat{R})$ according to Equation (19) are to be formed, element 423 is replaced by a short circuit.

To form the functions $\epsilon_3(\psi,\hat{R}) = w(\hat{R},\alpha)\cdot(\alpha - \hat{\alpha})$ or $\epsilon_4(\psi,\hat{R}) = w(R,\hat{\alpha})\cdot\text{sgn}(\alpha - \hat{\alpha})$, the output signal R of coordinate converter 411 is connected, via a delay block 417, with a first input of a block 419 which generates the weighting function $w(\hat{R},\alpha)$. If $w(\hat{R},\alpha)$ is explicitly dependent upon $\alpha$, the output signal $\alpha$ of coordinate converter 411 or the output signal of adder 414 is fed to the second input of block 419. The output signal of block 419 and the signal $\alpha - \hat{\alpha}$ or sgn $(\alpha - \hat{\alpha})$ are then multiplied by a multiplier 420. At the output of multiplier 420 there then appears a signal which is proportional to the function $\epsilon_3(\psi,R) = w(\hat{R},\alpha)\cdot(\alpha - \hat{\alpha})$ or to the function $\epsilon_4(\psi,R) = w(\hat{R},\alpha)\cdot\text{sgn}(\alpha - \hat{\alpha})$. This signal can be used for $u_{41}$ in FIG. 1.

Delay elements 415 to 418 may be omitted if the processing speed in blocks 412, 413, 414, 423 and 419 is sufficiently great compared to the clock step duration T.

Figure 13:
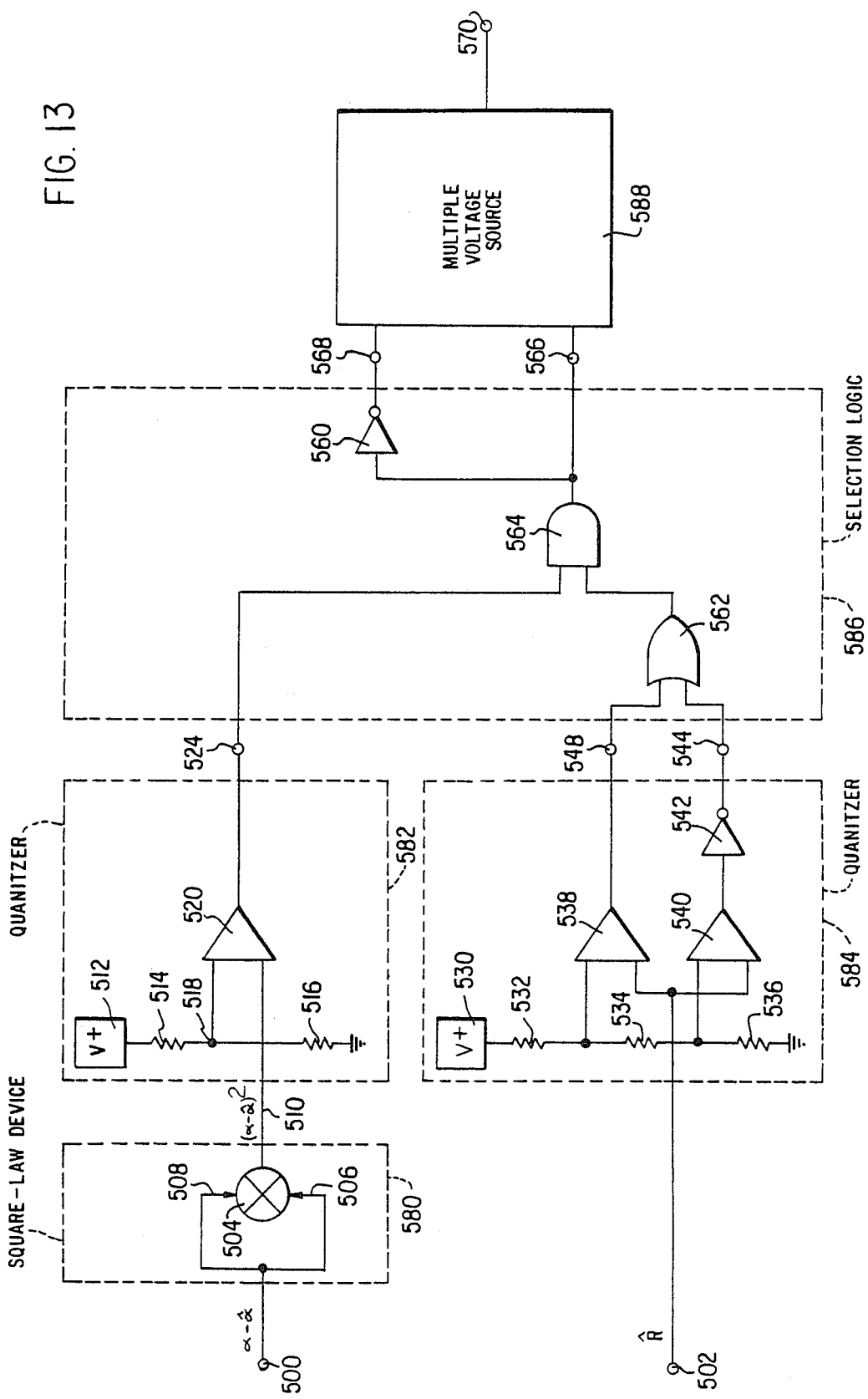
FIG. 13 is a circuit diagram illustrating an example of a weighting function generator according to FIG. 4.

FIG. 13 is a circuit diagram illustrating an example of a weighting function generator according to FIG. 4. The weighing function generator has two input terminals 500, 502 and one output terminal 570. It consists of a square-law device 580, two decision circuits or quantizers 582 and 584, one selection logic circuit 586 and a multiple voltage source 588. The circuit is an implementation for the 16-QAM signalling system. As will be seen, a signal is generated at output 570 which is at a high positive voltage if $\hat{R}$ is equal to $R_1$ or $R_3$ and the absolute value of $\alpha - \hat{\alpha}$ is greater than 10 degrees; a lower positive voltage is generated in all other cases.

The square-law device consists of a multiplier 504 with its two input lines 508 and 506 being connected to input terminal 500. A voltage representing $\alpha - \hat{\alpha}$ is fed to terminal 500 (see FIG. 4). Thus a voltage representing $(\alpha - \hat{\alpha})^2$ is present at output 510 of multiplier 504. This voltage is fed to the input of the first quantizer 582. This input is connected to one input of a comparator 520. Resistors 514 and 516 are series-connected between voltage source 512 and ground. The resistance values are selected so that the potential at the intermediate connection point 518 is equal to the voltage which would be generated at the output of multiplier 504 when $\alpha - \hat{\alpha}$ is 10 degrees. Thus, the comparator turns ON, if the signal at input terminal 500 corresponds to an angle difference with absolute value greater than 10 degrees. Otherwise it turns OFF. The output signal of comparator 520 is available at terminal 524.

A second quantizer 584 is built up in a very similar way as the quantizer according to FIG. 9. Voltage source 530, resistors 532, 534 and 536, and comparators 538 and 540 perform the same tasks as the corresponding parts in the circuit according to FIG. 9 which was described above. Thus, comparator 538 turns ON if $\hat{R}$ is greater than $\hat{R}_2$, that is, if $\hat{R}$ equals $R_3$, and the comparator 540 turns ON, if $\hat{R}$ is greater than $\hat{R}_1$, that is, if $\hat{R}$ equals $R_2$. The output of comparator 538 is connected to output terminal 548 and the output of comparator 540 is connected via an inverter 542 to output terminal 544 of quantizer 584. Therefore, the signal at terminal 544 turns ON if $\hat{R}$ equals $R_1$, and the signal at terminal 548 turns ON if $\hat{R}$ equals $R_3$. It will be apparent that, instead of using output terminals 548 and 544 of quantizer 584, it would be possible to use terminals 132 and 122 of the circuit according to FIG. 9. In this case, quantizer 584 may be omitted.

In the selection-logic circuit 586, the output signals of quantizers 582 and 584 are used to produce control signals for multiple-voltage source 588. Circuit 586 consists of an OR-gate, an AND-gate and an inverter. The OR-gate 562 turns ON if one of the signals at terminals 548 or 544 is ON, that is, if $\hat{R}$ equals either $R_1$ or $R_3$. The output of gate 562 is connected to one input of the AND-gate 564. The other input of gate 564 is connected to the output terminal 524 of quantizer 582. Since the signal at output terminal 524 is ON exactly if the absolute value of $\alpha - \hat{\alpha}$ is greater than 10 degrees, AND-gate 564 turns ON if and only if the absolute value of $\alpha - \hat{\alpha}$ is greater than 10 degrees and if $\hat{R}$ equals either $R_1$ or $R_3$. The output of AND-gate 564 is connected to terminal 566 and to terminal 568 via an inverter 560. The signal at terminal 568 is thus ON if $\hat{R}$ equals $R_2$ or if the absolute value of $\alpha - \hat{\alpha}$ is less than 10 degrees. Otherwise it is OFF.

The signals at terminals 568 and 566 are used to control a multiple-voltage source 588. At its output terminal 570, a positive voltage, e.g. 1 V, is generated if the signal at terminal 568 is ON and if the signal at terminal 566 is OFF. In the opposite case, a higher positive voltage, e.g. 4 V, is generated at output terminal 570. Thus, at output terminal 570 a signal is generated which is a function of $\hat{R}$ as well as $\alpha$.

A modification of the above described method will now be presented. In this case, the cartesian signal components x and y are approximated by way of quantized signal components $\hat{x}$ and $\hat{y}$. From the quantized cartesian signal components $\hat{x}$ and $\hat{y}$ there then results the quantized polar signal component:

$$\hat{\alpha} = \begin{cases} \arctan(\hat{y}/\hat{x}), & \text{if } \hat{x} \geq 0 \\ \arctan(\hat{y}/\hat{x}) + \pi, & \text{if } \hat{x} < 0 \end{cases} \quad (23)$$

Thus, the individual phase detector functions $\epsilon_2(\psi, \hat{R})$ and $\epsilon_4(\psi, \hat{R})$, respectively, are approximated as follows:

$$\epsilon_5(\psi,\hat{R}) = \text{sgn}(\hat{\alpha} - \hat{\alpha}) \quad (24)$$

and $$\epsilon_6(\psi,\hat{R}) = w(\hat{R},\hat{\alpha}) \cdot \text{sgn}(\alpha - \hat{\alpha}) \quad (25)$$

In principle, the determination of $\hat{\alpha}$ and $\hat{R}$ from $\hat{x}$, $\hat{y}$ is effected precisely as described above, except that now the signal pair $(\hat{x}, \hat{y})$ is available for the $\hat{R}$ and $\hat{\alpha}$ decision instead of $(x, y)$.

Only a certain number of pairs $(\hat{x}, \hat{y})$ exist, which number is dependent on the number of quantized stages for x and y. Therefore, no quantizing or decision making is required any longer to form $\hat{R}$ and $\hat{\alpha}$, only a linkage which associates a certain pair of output signals $(\hat{R}, \hat{\alpha})$ with each signal pair $(\hat{x}, \hat{y})$. In this way, a decision diagram can be formed in a very simple manner.

Figure 5:
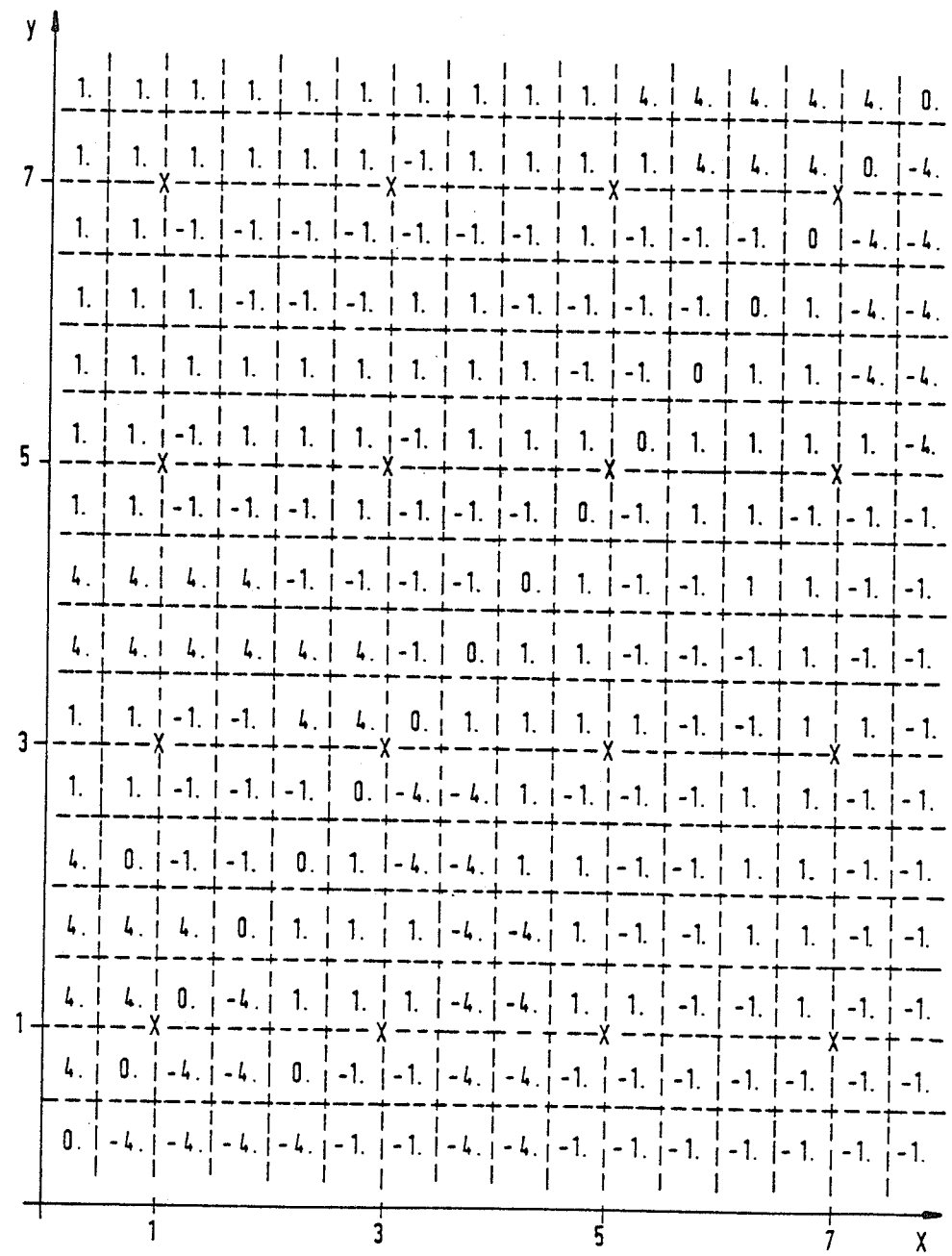
FIG. 5 is a decision diagram for a 64-QAM system.

A decision diagram derived from the individual phase detector function $\epsilon_6(\psi,\hat{R}) = w(\hat{R},\hat{\alpha}) \text{ sgn}(\hat{\alpha} - \hat{\alpha})$ for a 64-QAM signal is shown in FIG. 5.

In this embodiment, each of the signal components x and y is decided in 32 stages. The weighting function $w(\hat{R},\hat{\alpha})$ for this embodiment has been selected so that $w(\hat{R},\hat{\alpha}) = 4$ for $\hat{R} = R_1 = \sqrt{2}$, $\hat{R} = R_3 = \sqrt{18}$ and $\hat{R} = R_9 = \sqrt{98}$ and otherwise $w(\hat{R},\hat{\alpha}) = 1$. Due to the rotational symmetry of the decision diagram, only the first quadrant is shown in FIG. 5.

Figure 6:
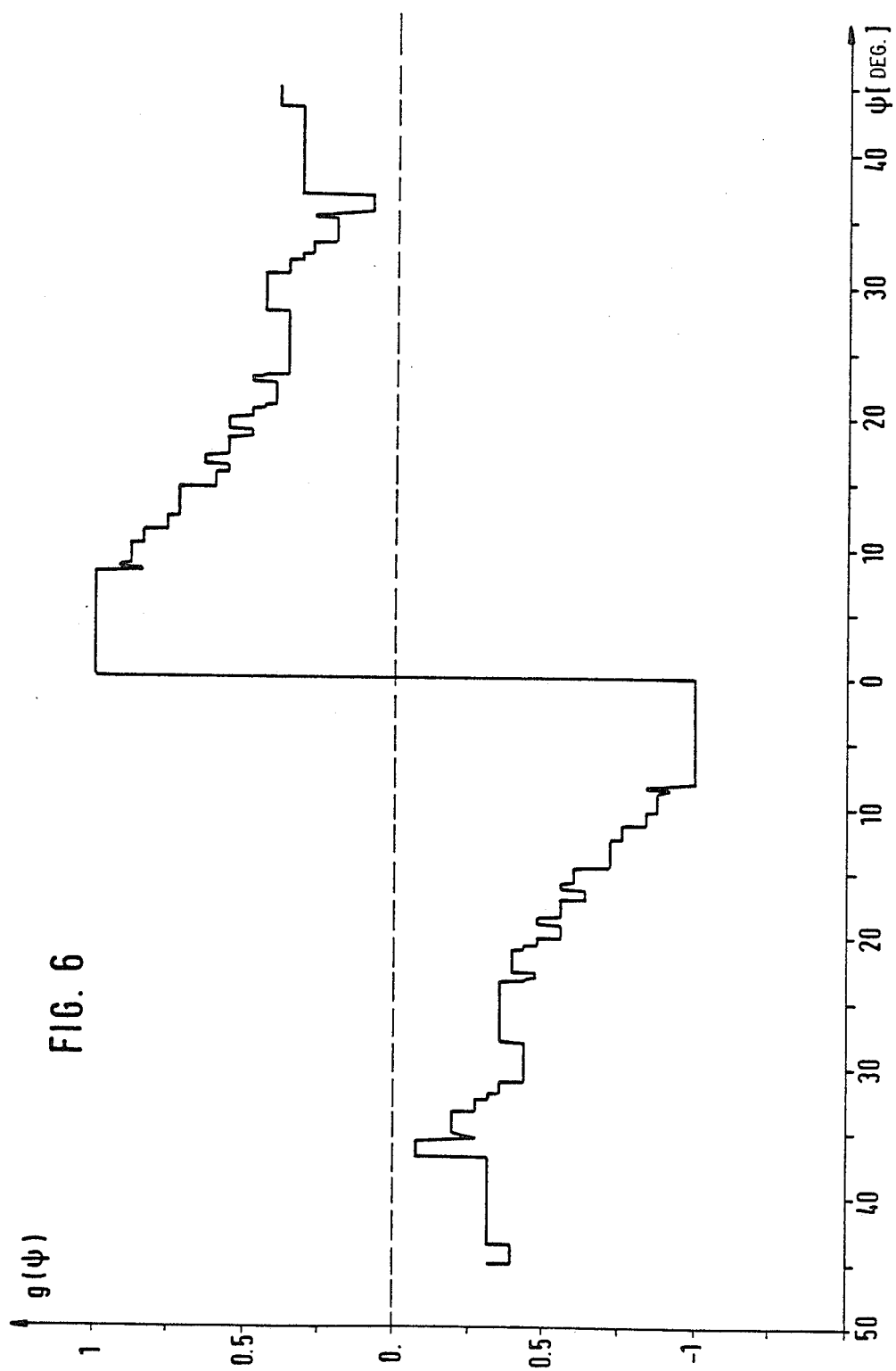
FIG. 6 is a phase detector characteristic for a 64-QAM system.

FIG. 6 shows the average phase detector characteristic $g(\psi) = <\epsilon_6(\psi,\hat{R})>_{\hat{R}}$ applicable for this example if it is assumed that all signal states occur at the same frequency. It can be seen that no synchronization error points exist within the interval $(-45°, +45°)$, because it is unequivocal that $g(\psi) = 0$ only for $\psi = 0°$.

The indiviual phase detector functions $\epsilon_5(\psi,\hat{R})$ and $\epsilon_6(\psi,\hat{R})$, hereinafter briefly called $\epsilon(\psi,\hat{R})$, can be determined according to a particularly simple method.

Figure 7:
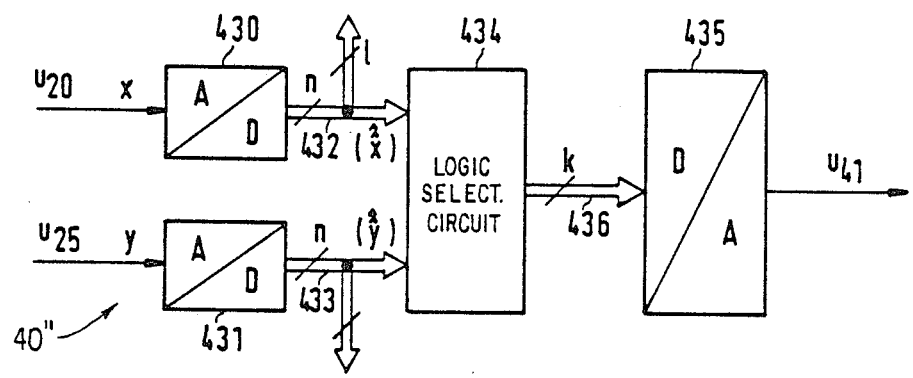
FIG. 7 is a circuit block diagram, as an alternative to that of FIG. 4, for the determination of a phase difference signal in accordance with the present invention.

A circuit block diagram of a baseband processing portion 40'' for implementing the method is shown in FIG. 7. The cartesian coordinate signal components x and y are quantized and coded by means of two analog/digital converters 430 and 431 so that n-bit words $\hat{x}$ and $\hat{y}$ are present at the outputs of 432 and 433 of digital/analog converters 430 and 431. The two n-bit outputs 432 and 433 of the analog/digital converter are connected to a logic selection circuit 434. This circuit forms the association of the various function values $\epsilon(\psi,\hat{R})$ with the input data (x, y) and puts out the function values in a k-bit coded form on a k-bit line 436. From this k-bit representation, a digital/analog converter 435 forms the signal proportional to $\epsilon(\psi,\hat{R})$.

In this realization, it is a particular advantage that after the synchronization, 1 of the n bits on lines 432 and 433 already represent the 1-bit coded form of the demodulated signals $\hat{x}$ and $\hat{y}$. One possible way to realize the logic selection circuit 434 is a memory (e.g. a RAM, ROM, PROM) which forms k function bits for the 2n-bit address formed of $\hat{x}$ and $\hat{y}$, with these function bits, in their entirety, corresponding to the function value of $\epsilon(\psi,\hat{R})$ belonging to each address.

Another advantage of the circuit according to FIG. 7 in combination with the embodiment of the selection circuit 434 as a memory is that the phase detector characteristic, which is fixed by the contents of the memory, can easily be changed by exchanging the memory or its contents.

Another digression is appropriate at this point to further explain the use of a memory (e.g., logic selection circuit 434) in a method according to the present invention. For this purpose we will return to the example of a 16-QAM system, as previously discussed with respect to Table 1 and FIG. 2. To facilitate matters the discussion will begin not with the use of address signals corresponding to cartesian oriented signals, as in the embodiment of FIG. 7, but with address signals which have been transformed to polar form by a coordinate converter (e.g., reference number 411 in FIG. 4). The output of the coordinate converter corresponding to amplitude provides an R address signal and the output corresponding to phase angle provides an $\alpha$ address signal. Assume for example that the $\alpha$ address signal is applied to the low order address input pins of a ROM (not illustrated) and that the R address signal is applied to the high order address input pins. A particular R address and particular $\alpha$ address then designate a single memory location within the ROM.

Figure 11A:
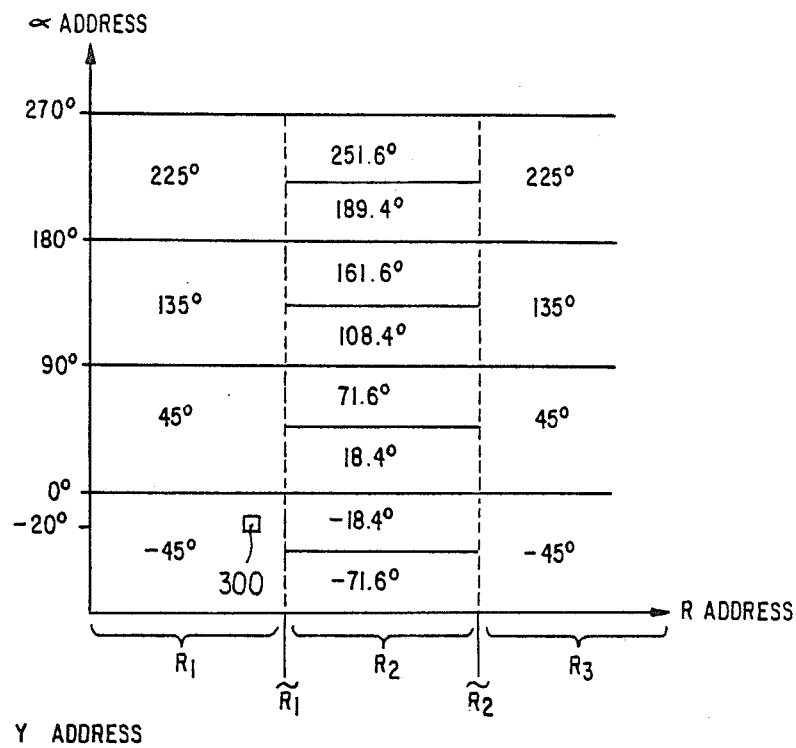
FIGS. 11A and 11B schematically illustrate the use of a memory in the embodiment of FIG. 8.

Turning next to FIG. 11A, it will be seen that the R addresses and $\alpha$ addresses define an area, different regions of which correspond to different memory locations in the ROM. One memory location, designated 300, is illustrated in FIG. 11A, and is accessed by an R address corresponding to a value of slightly less than $\bar{R}_1$ (that is, in the region of the nominal amplitude $R_1$) and an $\alpha$ address corresponding to a value of $-20°$. From the previous discussion of the 16-QAM example it will be apparent that, for a nominal amplitude that is less than $\bar{R}_1$, the available phase angles are $-45°$, $45°$, $135°$, and $225°$. Accordingly, at memory location 300 one could store $-45°$, which value would be read out as $\hat{\alpha}$ when location 300 is accessed. In a similar manner, when the R address corresponds to a value less than $\bar{R}_1$ but the $\alpha$ address corresponds to a value between $0°$ and $90°$, $45°$ could be stored for read-out. Similarly, in the range where the nominal amplitude has been determined to be $R_1$, $135°$ could be stored for readout when the $\alpha$ address lies between $90°$ and $180°$, and $225°$ could be stored for readout when the $\alpha$ address lies between $180°$ and $270°$. These same values would also be stored, as illustrated, when the nominal amplitude has been determined to be $R_3$. Since Table 1 illustrates that more phase angles are present when the nominal amplitude is determined to be $R_2(=\sqrt{18})$, the stored values for phase angle change more rapidly in the $R_2$ region with changes in the $\alpha$ address. For example, when the R address corresponds to a value between $\bar{R}_1$ and $\bar{R}_2$ and the $\alpha$ address is $-20°$, $-18.4°$ would be read out. If the $\alpha$ address were to change to a value corresponding to $-50°$, however, with the R address being unchanged, the value to be readout as $\hat{\alpha}$ would be $-71.6°$.

With continuing reference to FIG. 11A, the values to be stored need not correspond to the actual phase angles available for $R_1$, $R_2$, and $R_3$. Instead, it is preferable to store the difference between $\alpha$ and $\hat{\alpha}$. For example, when memory location 300 is accessed it is known that the phase angle $\alpha$ provided by the coordinate converter corresponds to $-20°$. Accordingly, the value $\alpha-\hat{\alpha}$ can be obtained directly from the ROM by storing a value corresponding to $25°$ at memory location 300. Other memory locations would, of course, also store the difference between the angle corresponding to the $\alpha$ address and the relevant phase angle for a true signal.

Figure 11B:
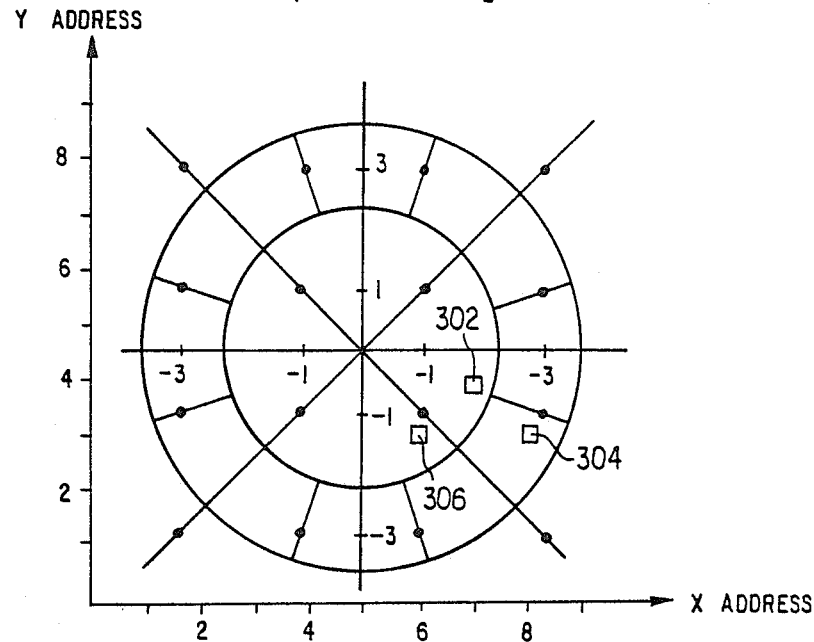

Turning next to FIGS. 7 and 11B, the next thing to realize is that the address signals for the memory need not be converted first to polar form. FIG. 11B illustrates the possible signal states and decision threshold values, as shown in FIG. 2, in the context of a memory space defined by X address signals and Y address signals. Three of the available memory locations 302, 304, and 306 are illustrated in FIG. 11B. It is location 302 that is accessed, for example, when the X address corresponds to 7 and the Y address corresponds to 4. It will be apparent that location 302 corresponds to an amplitude component R that is less than $\bar{R}_1$ and an $\alpha$ component corresponding approximately to $-20°$. Accordingly, a value corresponding to $25°$ would be stored at location 302 so that the value $\alpha-\hat{\alpha}$ could be read out from memory. Memory location 306 is still in the region where the nominal amplitude is determined to be $R_1$, but in this case the phase angle $\alpha$ is about $-50°$. Accordingly, a value corresponding to $-5°$ would be stored. Location 304 lies in the region between $\bar{R}_1$ and $\bar{R}_2$, that is, where the nominal amplitude is $R_2(=\sqrt{10})$, and the illustrated angle is about $-25°$. Accordingly, the value to be stored for $\alpha-\hat{\alpha}$ would correspond to $-6.6°$.

It will be apparent that, instead of storing phase angle difference values in memory locations 204–206, etc., such differences multiplied by a weighting function could be stored.

In the preceding description, average phase detector characteristics have been presented (see FIGS. 3, 6), which are free of synchronization error points. Such characteristics can advantageously be formed by the sign-of formation:

$$g(\psi)=\text{sgn}\,(<\epsilon(\psi,\hat{R})>\hat{R}) \qquad (26)$$

Figure 8:
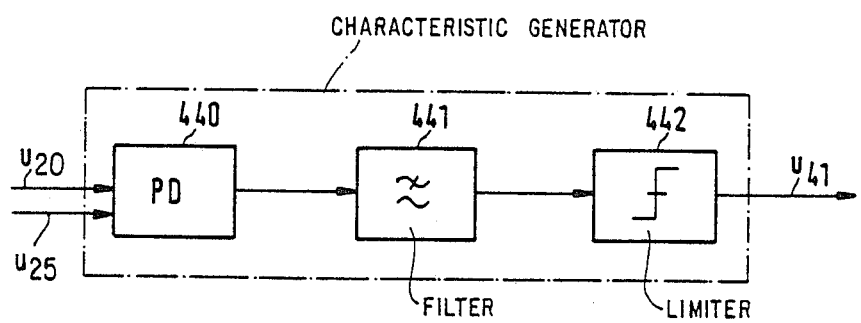
FIG. 8 is a circuit block diagram for the formation of an average phase detector characteristic.

A phase detector characteristic formed this way results in better acquisition behavior during the synchronization process. The formation of the phase detector characteristic according to Equation (26) is performed by a circuit block diagram as shown in FIG. 8. In a block 440, the individual phase detector functions $\epsilon(\psi,R)$ are determined according to the described methods. The output signal of block 440 is fed to a block 441 for average formation. Block 441 may, for example, be a simple lowpass filter. Finally, the output signal is switched from block 441 to the input of a limiter 442, which simulates the sign-on function. The output signal $g(\psi)=\text{sgn}\,\{<\epsilon(\psi,\hat{R})>\hat{R}\}$ of this limiter can be utilized as the input signal for a regulating filter 50 according to FIG. 1.

Figure 12:
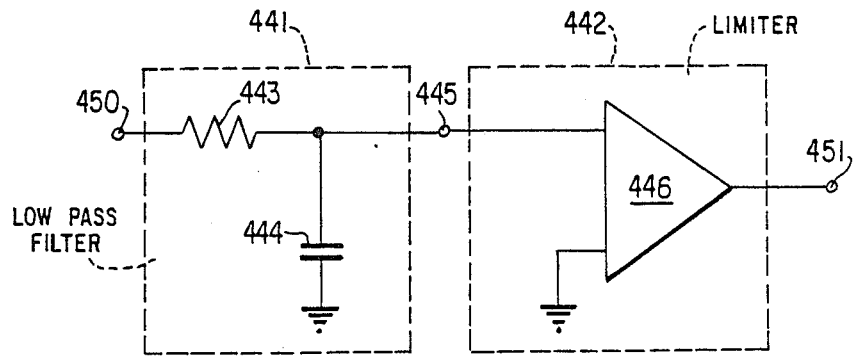
FIG. 12 is a circuit diagram illustrating an example of a low-pass filter and a limiter according to FIG. 8.

An example of a low-pass filter and a limiter is shown in FIG. 12.

In FIG. 12 the output signal of the phase detector is fed to the input terminal 450 of a low-pass filter 441 which is composed fo a resistor 443 and a capacitor 444. Resistor 443 is connected to input terminal 450 and output terminal 445 of the filter. Capacitor 444 is connected to terminal 445 and ground. The limit frequency of the filter should be lower than 4/mT (m=number of permissible signal states, T=symbol rate).

Output terminal 445 of the filter is connected to the input of limiter 442. The limiter is formed by a comparator 446 with one of its two inputs being grounded, the other being the limiter input. The signal at the comparator output 451 is thus at high voltage if the signal at terminal 445 is greater than 0 V. It is at low voltage if the signal at terminal 445 is less than 0 V. Comparator 446 thus acts as a limiter.

It will be understood that the above description of the present invention is susceptible to various modifications, changes and adaptations, and the same are intended to be comprehended within the meaning and range of equivalents of the appended claims.

What I claim is:

1. A method for recovering a signal representing the phase difference between a local oscillator signal and the carrier of a received signal that was generated by amplitude and/or phase shift keying, the received signal having a plurality of possible signal states, said method comprising the steps of:
    (a) dividing the received signal into a pair of cartesian oriented signal components which are a function of the phase difference and which are in quadrature relationship to one another, with the two signal components together representing one of the possible signal states;
    (b) converting the pair of cartesian oriented signal components into a corresponding pair of polar oriented signal components, with a first one of the pair of polar oriented signal components representing the amplitude of a signal state vector formed by the pair of cartesian oriented signal components and which a second one of the pair of polar oriented signal components representing the phase angle for this signal state vector;
    (c) using a first quantizer to determine which amplitude value, from a set of predetermined amplitude values for all possible true signal states that might have been transmitted, comes closest to the amplitude represented by the first polar oriented signal component;
    (d) using a second quantizer to determine which phase angle value, from a set of predetermined phase angle values for all possible true signal states that might have been transmitted, comes closest to the phase angle represented by the second polar oriented signal component and also belongs to a subset of phase angle values corresponding to the amplitude value determined in step (c); and
    (e) determining the difference between the phase angle value determined in step (d) and the phase angle of the second polar oriented signal component, said difference being proportional to the phase difference between the local oscillator signal and the carrier of the received signal.

2. The method of claim 1, further comprising the step of using a signal representing the phase difference determined in step (e) to control a voltage controlled oscillator in a demodulator circuit for the received signal, the voltage controlled oscillator generating the local oscillator signal.

3. The method of claim 1, further comprising the step of using a limiter circuit to determine a predetermined function of the difference determined in step (e), the predetermined function being the sign-of function.

4. The method of claim 3, further comprising the step of multiplying the sign-of function by a weighting function having a value which is inversely related to the number of signal states having polar oriented signal components with the same amplitude as the signal state for which the phase angle difference was determined in step (e).

5. The method of claim 4, wherein the weighting function takes on only non-negative values.

6. The method of claim 5, further comprising the step of using a signal representing the product of the sign-of function and the weighting function to control a voltage controlled oscillator in a demodulator circuit for the received signal, the voltage controlled oscillator generating the local oscillator signal.

7. The method of claim 1, further comprising the step of multiplying the phase angle difference determined in step (e) by a weighting function having a value which is inversely related to the number of signal states having polar oriented signal components with the same amplitude as the signal state for which the phase angle difference was determined in step (e).

8. The method of claim 7, wherein the weighting function takes on only non-negative values.

9. The method of claim 8, further comprising the step of using a signal representing the product of the phase angle difference and the weighting function to control a voltage controlled oscillator in a demodulator circuit for the received signal, the voltage controlled oscillator generating the local oscillator signal.

10. A method for recovering a signal representing the phase difference between a local oscillator signal and the carrier of a received signal that was generated by amplitude and/or phase shift keying, the received signal having a plurality of possible signal states, said method comprising the steps of:
    (a) dividing the received signal into a pair of cartesian oriented signal components which are dependent on the phase difference and which are in quadrature relationship with one another, each of the components having a plurality of possible values and the pair of components together representing one of the possible signal states;
    (b) quantizing the pair of cartesian oriented signal components, with the number of quantizing steps for each component being greater than the number of possible values for that component;
    (c) applying the pair of quantized signal components as an input signal to a decision circuit which stores a plurality of different values and which provides a predetermined one of the stored values in response to the pair of quantized signal components, the predetermined one of the stored values being formed by
        converting the pair of cartesian oriented quantized signal components into a corresponding pair of polar oriented signal components, with a first one of the pair of polar oriented signal components representing the amplitude of a signal state vector formed by the pair of cartesian oriented quantized signal components and with a second one of the pair of polar oriented signal components representing the phase angle for this signal state vector,
        determining which amplitude value, from a set of predetermined amplitude values for all possible true signal states that might have been transmitted, comes closest to the amplitude represented by the first polar oriented signal component, determining which phase angle value, from a set of predetermined phase angle values for all possible true signal states that might have been transmitted, comes closest to the phase angle represented by the second polar oriented signal component and also belongs to a subset of phase angle values corresponding to the amplitude value determined as coming closest to the amplitude represented by the first polar oriented signal component, and finding the difference between the determined phase angle value and the phase angle represented by the second polar oriented signal component, the predetermined one of the stored values being a function of this difference.

11. The method of claim 10, wherein the decision circuit is a memory in which the plurality of different values are stored, wherein the input signal to the decision circuit is an address signal for the memory, wherein step (b) is conducted using analog-to-digital converters which quantize the pair of cartesian oriented signal components in parallel to provide a digital word, and wherein step (c) is conducted by applying the digital word to the memory as an address signal for reading out a stored value.

12. The method of claim 11, wherein the predetermined one of the stored values corresponds to the difference between the determined phase angle and the phase angle represented by the second polar oriented signal component.

13. The method of claim 12, further comprising the step of using a signal representing the value read out of the memory to control a voltage controlled oscillator in a demodulator circuit for the received signal, the voltage controlled oscillator generating the local oscillator signal.

14. The method of claim 11, wherein the predetermined one of the stored values is a sign-of function of the difference between the determined phase angle value and the phase angle represented by the second polar oriented signal component.

15. The method of claim 11, wherein the predetermined one of the stored values is formed by multiplying the sign-of function of the difference between the determined phase angle value and the phase angle represented by the second polar oriented signal component, and a weighting function having a value which is inversely related to the number of signal states having polar oriented signal components with the same amplitude as the signal state determined for the first polar oriented signal component.

16. The method of claim 15, wherein the weighting function takes on only non-negative values.

17. The method of claim 16, further comprising the step of using a signal representing the value read out of the memory to control a voltage controlled oscillator in a demodulator circuit for the received signal, the voltage controlled oscillator generating the local oscillator signal.

18. The method of claim 11, wherein the predetermined one of the stored values is formed by multiplying the difference between the determined phase angle value and the phase angle represented by the second polar oriented signal component, and a weighting function having a value which is inversely related to the number of signal states having polar oriented signal components with the same amplitude as the signal state determined for the first polar oriented signal component.

19. The method for claim 18, wherein the weighting function takes on only non-negative values.

20. The method of claim 19, further comprising the step of using a signal representing the value read out of the memory to control a voltage controlled oscillator in a demodulator circuit for the received signal, the voltage controlled oscillator generating the local oscillator signal.

21. A method for recovering a signal representing the phase difference between a local oscillator signal and the carrier of a received signal that was generated by amplitude and/or phase shift keying, the received signal having a plurality of possible signal states each corresponding to a respective signal state vector which can be represented in either cartesian or polar form, said method comprising the steps of:

(a) dividing the received signals into a pair of cartesian oriented signal components which are a function of the phase difference and which are in quadrature relationship to one another, the two signal components togethers representing one of the possible signal states;

(b) generating an address signal from the two signal components, the address signal having first and second portions which together represent one of the signal states;

(c) applying both portions of the address signal to a memory which contains a plurality of stored values that are a function of the phase angles of the signal state vectors of all true signal states that might have been transmitted, the first portion of the address signal designating a region in the memory which contains stored values for a subset of the true signal states that might have been transmitted and the second portion of the address signal designating a particular stored value contained in the region of the memory designated by the first portion of the address signal; and (d) adjusting a circuit element in accordance with the stored value read out of the memory by the address signal.

22. The method of claim 21, wherein the pair of cartesian oriented signal components is in analog form, and wherein step (b) comprises converting the cartesian oriented signal components in analog form to cartesian oriented portions, in digital form, of the address signal.

23. The method of claim 21, wherein the pair of cartesian oriented signal components is in analog form, and wherein step (b) comprises converting the cartesian oriented signal components in analog form to polar oriented portions, in digital form, of the address signal.

24. The method of claim 21, wherein the stored values are a function of the difference between the phase angles of the signal state vectors of all true signal states that might have been transmitted and the phase angles or received signals.

25. The method of claim 21, wherein the stored values are a function of a weighing factor times the difference between the signal state vectors of all true signal states that might have been transmitted and the phase angles of receives signals.

* * * * *